Jan. 20, 1970 N. E. WOLFF 3,490,946

MAGNETIC RECORDING ELEMENTS

Filed Dec. 29, 1966

INVENTOR
Nikolaus E. Wolff

By

Attorney 3,490,946
MAGNETIC RECORDING ELEMENTS
Nikolaus E. Wolff, Princeton, N.J., assignor to RCA Corporation, a corporation of Delaware
Filed Dec. 29, 1966, Ser. No. 605,834
Int. Cl. G11b *5/70, 5/72*
U.S. Cl. 117—235 10 Claims

ABSTRACT OF THE DISCLOSURE

This invention relates to magnetic recording elements in which the magnetic coating has outstanding lubricity. The magnetic recording elements are especially useful in magnetic tape recording devices particularly wherein it is desirable to reduce the friction between, and the abrasion to, the magnetic coating and the recording head.

BACKGROUND OF THE INVENTION

In a magnetic tape recording apparatus, the magnetic tape is in contact with the magnetic recording head and moves past the head at high relative speeds. This abrades both the magnetic tape and the magnetic recording head and results in reduced life of both the magnetic tape and the magnetic recording head. Another problem in magnetic tape recording is the friction between the surface of the magnetic coating of the recording tape and the surface of the tape head. It is desirable to have surfaces with as low a coefficient of friction as possible in order to reduce the force necessary to pull the tape past the recording head. To reduce this abrasion problem, and to reduce the coefficient of friction of the surface of the magnetic coating, various lubricated tape coatings have been proposed. However, an entirely satisfactory solution to the problem has not yet been developed.

SUMMARY OF THE INVENTION

The novel magnetic recording tapes are similar in structure to previous magnetic recording tapes and are characterized in that at least one low vapor pressure fluorocarbon compound is included as part of the magnetic coating. Preferably, the fluorocarbon compound is dispersed in the mixture of binder and magnetic particles which comprises the magnetic coating of the recording tape. Alternatively, it may be included as a surface layer of the magnetic coating. The fluorocarbon compound acts as a lubricant to lubricate the magnetic coating surface. Improved lubricity is obtained irrespective of the particular binder and/or particles contained in the coating composition to which the fluorocarbon is added. By virtue of including the fluorocarbon, the novel magnetic recording tapes exhibit markedly less abrasion to both tape and recording head, compared to similar tapes without the fluorocarbon. This results in both extend tape life and in extended magnetic recording head life. In addition, less force is necessary to pull the tape past the recording head due to the low frictional surface of the novel tapes.

The particular fluorocarbon lubricant incorporated in the tape coating may be liquid or solid and should have a low vapor pressure to prevent significant evaporation on storage. Typically, the useful fluorocarbon compounds are highly fluorinated polymers or telomers having vapor pressures in the range from about $10^{-3}$ to less than $10^{-7}$ mm. of Hg at room temperature.

DESCRIPTION OF THE PREFERRED EMBODIMENTS

Figure 1:
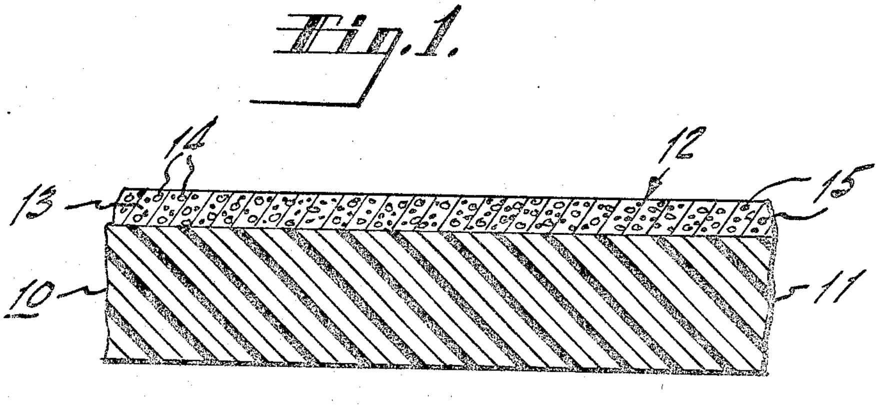
FIGURE 1 is a cross sectional view of a preferred embodiment of a novel magnetic recording tape.

The novel magnetic recording tape 10 of FIGURE 1, comprised of a non-magnetic support base 11, and magnetic coating 12 on one side thereof. The magnet coating 12, as shown, is comprised of a binder 13 havir both fluorocarbon particles 14 and magnetic particles 1 dispersed therein.

The particular support base 11 is an oriented polyet ylene terephthalate (Mylar) film. Other suitable bas include, for example, bases made of paper, celluło acetate and oriented polyvinyl chloride. The support ba 11 is typically 1.5 mils thick, although other thicknesse preferably between 0.50 and 2.5 mils, may be used. Th base 11 may be of any width, for example between 0.2 and 3.0 inches wide, and may be of any length, usual thousands of feet long.

Any of the usual magnetic particles may be used the novel recording elements. For example, one may u metallic particles, such as iron particles, or preferab oxidic particles such as gamma iron oxide, chromiu dioxide, or a ferrite such as a zinc ferrous ferrite. Th magnetic particles 15 are preferably acicular in shap The binder 13 for the coating can be any of the usu polymeric binders useful in magnetic recording tape coa ings. For example, polyurethane type binders, such those derived from an isocyanate-terminated polyalky eneether prepolymer, and binders including an acryl resin such as a mixture of an acrylic polymer and polyvinyl chloride-polyvinyl acetate copolymer, may b used.

Fluorocarbon compounds useful as lubricants in ma netic recording elements include: (1) solid fluorocarbo polymers, for example, polytetrafluoroethylene and c polymers of tetrafluoroethylene and hexafluoropropyler or tetrafluoroethylene and vinylidene fluoride; (2) liqu fluorocarbon polymers, such as low molecular weig polytrifluorochloroethylene polymers sold under th name, Fluorolube, by the Hooker Electrochemical Con pany; (3) fluorocarbon esters such as those produced b the reaction of fluoroalcohols and aromatic polyacids suc as pyromellitic acid; and (4) solid or liquid telomers, suc as the telomers of low molecular weight fluorocarbo polymers or copolymers as described in U.S. Patent 2,856 400 issued to Nikolaus E. Wolff. The preferred embod ment includes solid fluorocarbon particles 14 of a pol tetrafluoroethylene polymer dispersed in the magnet coating 12.

The preferred novel magnetic recording tapes may b prepared by the following steps:

(1) Applying, to a supporting film or base, a layer a coating mixture comprised of magnetic particles an at least one low vapor pressure fluorocarbon compoun dispersed in a polymeric binder;

(2) Orienting the magnetic particles in the applie layer;

(3) Drying the layer of coating mixture; and (4) Curing the dried layer.

Typically, the amount of fluorocarbon compound di persed in the tape coating is in the range of about 0 to 10 weight percent based on the total weight of th dried coating. Quantities less than 0.2 weight perce have relatively little lubricating effect. Quantities great than 10 weight percent generally result in excessive smea ing or gunking of the lubricant on the tape head. Th increases the distance between the tape head and th magnetic particles in the tape coating, thereby reduci the flux density of the input signal on the tape.

The preferred quantity of lubricating fluorocarbo compounds dispersed in the tape coating depends in pa upon the particular fluorocarbon compound or mixture of fluorocarbon compounds and upon the particular coating composition comprising the magnetic recording tape. When solid fluorocarbon lubricants are employed, it is preferred that the particle size of the lubricant used in making the coating mixture be less than about 2 microns.

Figure 2:
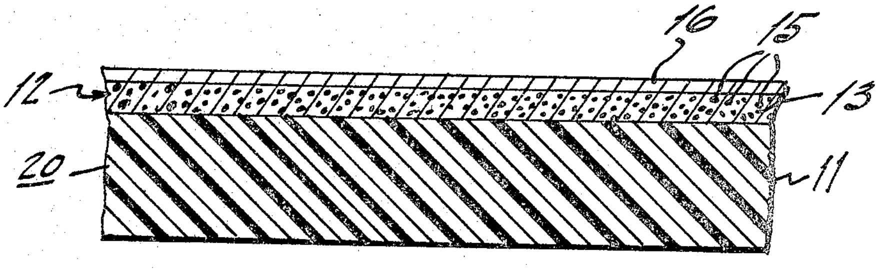
FIGURE 2 is a cross sectional view of another embodiment of a novel recording tape.

The novel recording element 20, shown in FIGURE 2 is comprised of a non-magnetic support base 11 and a magnetic coating 12 on one side thereof. The magnetic coating 12 is comprised of magnetic particles 15 dispersed in a binder 13 and a fluorocarbon film 16 as a top surface layer of the coating 12. The fluorocarbon film 16 may be applied by spraying techniques.

When the fluorocarbon compound is applied as a film 16 on the surface of the magnetic coating 12, the film 16 should be of the minimum possible thickness required to give a uniform surface of low coefficient of friction. This will minimize the reduction of signal to noise ratio due to the separation of the magnetic coating from the magnetic head.

Typically, a thickness of about 50 micro-inches is practical for tapes used in computers. Also, the film 16 should adhere well to the surface of the magnetic coating 12.

U.S. Patent 2,804,401 issued to B. A. Cousino, discloses spraying of colloidal graphite, dispersed in a liquid fluorocarbon carrier such as Freon, upon the surface of a magnetic coating to form a layer of graphite thereon. This differs from the present disclosure at least in that the liquid fluorocarbon carriers used by Cousino are highly volatile liquids that evaporate from the coating surface shortly after application, whereas the fluorocarbon compounds included in this invention are not highly volatile and in fact have low vapor pressures so as not to substantially evaporate from the surface of the magnetic coating even on prolonged storage of several years.

EXAMPLE 1

A coating mixture is prepared by milling, for about 5 hours, a mixture of the following ingredients: 880 grams of acicular gamma iron oxide; 47.0 grams of a perfluorinated ethylene-propylene copolymer, such as TL–120 marketed by Liquid Nitrogen Processing Corporation, Malvern, Pa.; 96.3 grams of a vinyl acetate-vinyl alcohol-vinyl chloride copolymer; 179.2 grams of a polyalkylenether - isocyanate - terminated -prepolymer; 470 grams of methyl ethyl ketone and 940 grams of xylene. The TL–120 used herein is a solid having a softening point of about 322° C. and a particle size between 1 and 2 microns.

A layer of the coating mixture is then applied to a supporting film, such as Mylar, by doctor blading or other techniques known in the art. The magnetic particles in the layer are then oriented by passing the layer through a magnetic field. The layer is then dried and the dried layer is cured. A more detailed description of a method for preparing tapes can be found in U.S. Patent 3,150,995 issued to H. Bauer.

Example 2

A coating mixture is prepared by milling a mixture of the following ingredients for 5 hours: 880 grams of acicular gamma iron oxide; 44.0 grams of a tetrafluoroethylene telomer, such as, Vydax AR marketed by E. I. du Pont de Nemours and Company, Wilmington, Del.; 545 grams of a polyalkyleneether-isocyanate-isocyanate-terminated prepolymer; and 1240 grams of 1,1,2-trichloroethane. The Vydax AR used herein has a molecular weight of about 3700 and melts at about 300° C. Some sublimation of the telomer occurs at temperatures above 215° C. The procedure for making recording tape from the coating mixture is the same as in Example 1.

Example 3

A coating mixture is prepared by milling, for about

6½ hours, a mixture of the following ingredients: 40.0 grams of an acrylic polymer; 28.8 grams of a vinyl chloride-vinyl acetate copolymer; 40.0 grams of lecithin; 28.7 grams of stabilizers and plasticizers; 325 grams of acicular gamma iron oxide; 325 grams of a 3:2 weight ratio of toluene:methyl ethyl ketone solvent mixture; and 1.5 grams of Fluorolube-S liquid fluorocarbon polymer sold by the Hooker Electrochemical Company. Fluorolube-S is a liquid polymer having a molecular weight of about 775 and a vapor pressure of $2.5\times10^{-3}$ mm. of Hg at 100° F.

The procedure set forth in Example 1 is then followed to make recording tape from the coating mixture.

Example 4

A coating mixture is prepared by milling for about 4 hours, a mixture of the following ingredients; 80.0 grams of an isocyanate-terminated polyester prepolymer; 1.5 grams lithium stearate stabilizer; 10.0 grams of Union Carbide NPX non-ionic dispersing agent; 7.0 grams of tricresylphosphate plasticizer; 300 grams of acicular zinc ferrous ferrite; 301 grams of toluene; 299 grams of methyl ethyl ketone; and 1.5 grams of Hooker's Fluorolube-S liquid trifluorochloroethylene polymer.

The procedure set forth in Example 1 is then followed to produce a recording tape from the coating mixture.

Example 5

A coating mixture is prepared as in Example 1 but eliminating the vinyl acetate-vinyl-alcohol-vinyl chloride copolymer and changing the weight of the polyalkyleneether-isocyanate-terminated prepolymer from 179.2 grams to 275 grams. The same procedure is then followed to prepare a recording tape from the coating mixture.

TESTS

Coefficient of friction measurements performed on a friction-meter were made with the novel recording tapes versus various magnetic head materials such as Mu-metal, HiMu 80 and Alfecon.

The particular friction-meter employed to determine coefficients of friction was a Frictionometer, manufactured by Custom Scientific Instruments Inc. of Kearny, N.J. This friction-meter requires that a length of magnetic tape be mounted, coating face out, around the outer circumference of a drum which is approximately four inches in diameter and ½ inch wide. A disc of magnetic head material, approximately two centimeters in diameter and 2 millimeters in thickness, is mounted above the drum on a pivotal shaft so that the axis through the disc is essentially parallel to the axis through the drum. The disc is then brought to rest on the surface of the magnetic tape with a force of 50 grams plus or minus ½ gram. In this configuration, frictional forces between the tape, which is made to rotate with the drum, and the non-rotatable disc, cause displacement of the disc and pivotally mounted shaft to which it is attached in a proportion related to the frictional force. Measurement of the displacement then allows for calculation of the coefficient of friction. It was found by the above test that tapes having fluorocarbons, such as TL–120 or Vydax AR, as part of the tape coating, have a dynamic coefficient of friction of about 33% less than tapes prepared in the same manner but excluding the fluorocarbon compound. In one test, a novel recording tape prepared in the manner described in Example 5, had a coefficient of friction of about 50% lower than a tape prepared the same way but excluding the fluorocarbon compound.

Tape life was measured by an abrasion resistance test. This test is run on a standard RCA Model 581 tape station which has been adjusted according to the approved maintenance instructions. According to this test, 20 discrete messages, each approximately 1 inch long and with intermessage gaps of approximately 0.6 inch in length, are recorded on a piece of tape approximately 10 feet long. These messages are then read in both directions, making a full stop in each gap. The message configuration is made so that each starting impact of the pressure rollers used to move the tape occurs in the message area and not in the gap. Under these conditions, the tape life is considered terminated when the output of any one message falls below 50% of the original signal level.

Tape life, measured by the abrasion resistance test, was extended by as much as two orders of magnitude by including a fluorocarbon compound as disclosed herein in the tape coating. For example, a novel recording tape prepared as described in Example 5 had a tape life of at least 100,000 passes over the recording head as compared to about 1,000 passes for a similar tape excluding the fluorocarbon compound.

While the foregoing description deals with magnetic tape, it is to be understood that the novel feature of including a low vapor pressure fluorocarbon compound as part of the magnetic coating of a recording element is also applicable to other forms of recording elements, for example, magnetic discs, cards and drums.

What is claimed is:

1. In a magnetic recording element of the type including a base and a coating upon a surface of said base, said coating being comprised of magnetic particles dispersed in a polymeric binder and a lubricant, wherein the improvement comprises a lubricant consisting of at least one low vapor pressure fluorocarbon compound included in said coating.

2. The magnetic recording element described in claim 1, wherein said fluorocarbon compound is dispersed in the polymeric binder of said magnetic coating.

3. The magnetic recording element described in claim 1, wherein said fluorocarbon compounds are polymers.

4. The magnetic recording element described in claim 3, wherein at least one of said fluorocarbon compounds is in the form of solid polymeric particles dispersed in the coating.

5. The magnetic recording element described in claim 3, wherein at least one of the fluorocarbon compounds is a liquid polymer dispersed in the coating.

6. The magnetic recording element described in claim 5, wherein said liquid polymers include a polymer of trifluorochloroethylene.

7. The magnetic recording element described in claim 4, wherein said solid particles include particles selected from the group consisting of polymeric tetrafluoroethylene and copolymers thereof.

8. The magnetic recording element described in claim 3, wherein said polymers include telomers of tetrafluoroethylene.

9. The magnetic recording element described in claim 4, wherein said solid particles are less than 2 microns in size.

10. The magnetic recording element as described in claim 2, wherein said fluorocarbon compounds constitute between 0.2 and 10 weight percent of the coating.

References Cited

UNITED STATES PATENTS

| | | | |
|---|---|---|---|
| 2,866,764 | 12/1958 | West et al. | 117—161 X |
| 2,866,765 | 12/1958 | Smith | 117—161 X |
| 3,276,946 | 10/1966 | Cole et al. | |
| 3,319,012 | 5/1967 | Reed et al. | |
| 3,398,011 | 8/1968 | Neirotti et al. | 117—121 X |

OTHER REFERENCES

Friedman et al., Lubricants for Magnetic Recording Media, December 1966, p. 779, IBM Technical Disclosure Bulletin.

WILLIAM D. MARTIN, Primary Examiner

B. D. PIANALTO, Assistant Examiner

U.S. Cl. X.R.

117—238, 239, 240